C. T. GENZEL.
STEERING MECHANISM.
APPLICATION FILED DEC. 9, 1911.
1,043,088.
Patented Nov. 5, 1912.
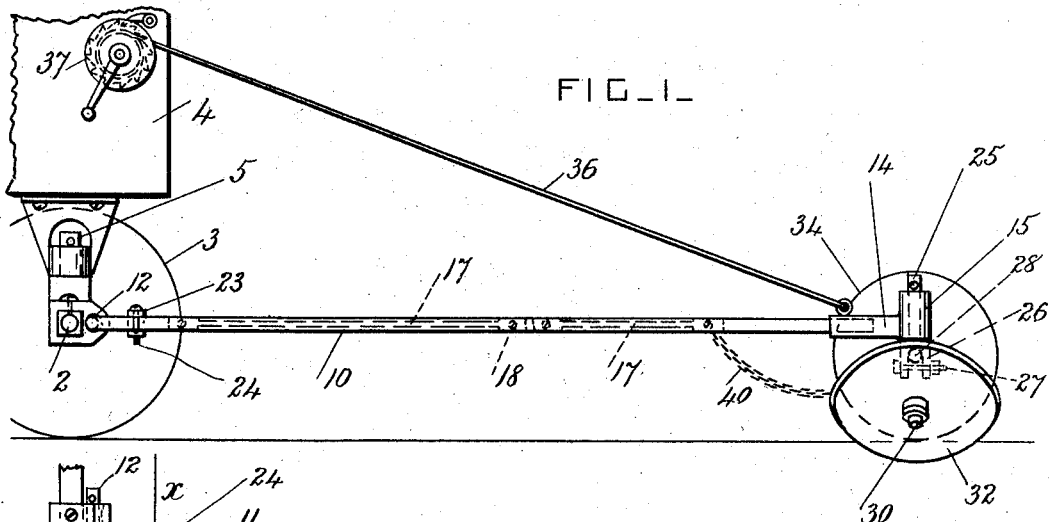
FIG_1_
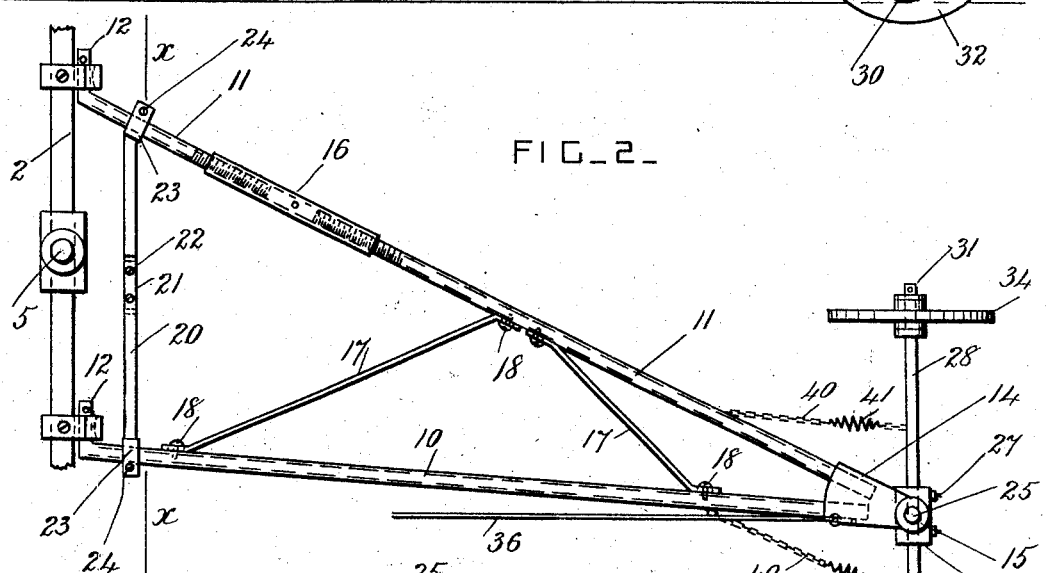
FIG_2_
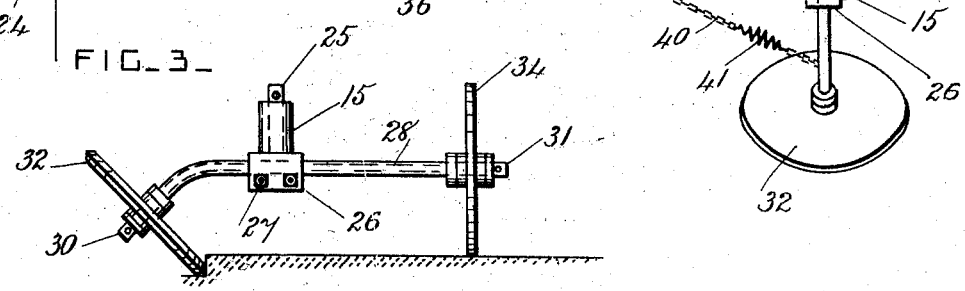
FIG_3_
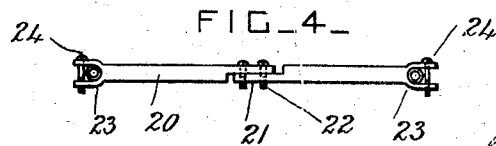
FIG_4_
Witnesses
P. Fiske
Wm N Yates
Inventor
Charlie T. Genzel.
By Herbert W. Jenner.
Attorney

UNITED STATES PATENT OFFICE.

CHARLIE T. GENZEL, OF WIMBLEDON, NORTH DAKOTA.

STEERING MECHANISM.

1,043,088. Specification of Letters Patent. Patented Nov. 5, 1912.

Application filed December 9, 1911. Serial No. 664,899.

*To all whom it may concern:*

Be it known that I, CHARLIE T. GENZEL, a citizen of the United States, residing at Wimbledon, in the county of Barnes and State of North Dakota, have invented certain new and useful Improvements in Steering Mechanism; and I do hereby declare the following to be a full, clear, and exact description of the invention, such as will enable others skilled in the art to which it appertains to make and use the same.

This invention relates to steering mechanism for use in connection with traction engines in plowing outfits; and it consists in the novel construction and combination of the parts hereinafter fully described and claimed whereby the traction engine is steered automatically, while plowing, by means of a furrow wheel which runs in a furrow previously plowed in the ground.

In the drawings, Figure 1 is a side view of the front end portion of a traction engine provided with a steering attachment according to this invention. Fig. 2 is a plan view of the attachment. Fig. 3 is a front view of the front part of the attachment. Fig. 4 is a cross-section through the supporting frame, taken on the line $x$—$x$ in Fig. 2, and showing the adjustable cross brace.

The traction engine is of any approved construction, and it is provided with a front axle 2 having ground wheels 3. This front axle is pivoted to the main frame 4 of the engine by a vertical pivot 5, and it is provided with any approved steering mechanism for guiding the engine by hand in the ordinary way.

In order to steer the engine automatically, while plowing, and after a furrow has been plowed in the ground, two arms 10 and 11 are pivoted by pins 12 to the front axle 2. These arms are arranged at an angle to each other, and they project in a substantially horizontal plane in front of the engine. A bracket 14 is secured to the front end portions of these arms and is provided with a vertical bearing 15. The two arms are of unequal length, and the longer arm 11 is formed in sections and provided with a coupling device 16 so that it can be lengthened or shortened at will to adjust the position of the center of the bearing 15 with reference to the engine and the furrow. Diagonal braces 17 are secured between the arms 10 and 11, and their end portions are secured adjustably to the arms by bolts 18 so that they can be adjusted to suit the adjustment of the arms.

A cross brace 20 is provided at the rear end portion of the supporting frame, and is formed in two sections having a lap joint 21 at the middle part of the brace, and bolts 22 for securing the sections of the brace together after its length has been adjusted. The ends of the brace are provided with contractible sockets 23 and clamping bolts 24 to connect the brace to the arms of the frame and to permit all the necessary adjustments. The arms 10 and 11 are preferably formed of metallic tubing, but they may be formed in any other approved way.

A vertical spindle 25 is journaled in the bearing 15, and the lower end of this spindle is provided with a contractible socket 26 and clamping bolts 27. A steering axle 28 is clamped in the socket 26, and is provided at one end with an inclined axle spindle 30 which is arranged at an angle of about 45° with respect to the main portion of the axle and the axle spindle 31 on its other end. A furrow wheel 32 is journaled on the inclined axle spindle 30, and runs in the angle of the furrow at about an angle of 45° to the surface of the ground, as shown in Fig. 3. A ground wheel 34 is journaled on the axle spindle 31, and runs on the unplowed surface of the ground. The position of the steering axle in the socket 26 can be adjusted both longitudinally and circumferentially when the clamping bolts are slackened. When the position of the center of the spindle 25 is adjusted, the position of the furrow wheel is also adjusted but without changing the distance between the spindle 25 and the furrow wheel, which distance can be adjusted independently, and so as to suit all requirements.

A cord 36, or other suitable lifting tackle, is secured to the bracket 14, and its rear end is connected to any suitable hoisting barrel or device 37 carried by the main frame of the traction engine. This cord or tackle is used to raise the wheels 32 and 34 clear of the ground when the traction engine is turned around at the end of the field.

Flexible check connections or chains 40 are provided between the frame and the steering axle for limiting the movements of the axle, and these connections have springs 41 inserted in their length.

This attachment will steer the engine automatically when the furrow wheel is started up a furrow, and it thereby saves the labor of one man in handling the engine, while plowing; as when the engine is steered in the ordinary way, by hand, a man is required to attend to the steering mechanism.

What I claim is:

1. The combination, with a traction engine having a pivoted front axle and ground wheels, of a frame pivoted to the front axle and projecting forwardly thereof and provided with a vertical bearing at its free end, a spindle journaled in the said bearing, a steering axle having its middle part secured to the said spindle and having an axle spindle at one end which is inclined with respect to the axle spindle at its other end, connections arranged one on each side of the said spindle and secured between the axle and the frame to limit the pivotal movement of the axle, and an inclined furrow wheel and a ground wheel mounted on the respective axle spindles.

2. The combination, with a traction engine having a pivoted front axle and ground wheels, of a frame pivoted to the front axle and projecting forwardly thereof and provided with a vertical bearing at its free end, a spindle journaled in the said bearing and having a socket at one end, a steering axle which is adjustable longitudinally and circumferentially in the said socket and which has an axle spindle at one end which is inclined with respect to the axle spindle at its other end, and an inclined furrow wheel and a ground wheel mounted on the respective axle spindles.

3. The combination, with a traction engine having a pivoted front axle and ground wheels, of a frame comprising two inclined arms connected together by adjustable braces and pivoted to the front axle and provided with a vertical bearing at its free end, one of the said arms being extensible longitudinally to adjust the position of the said bearing, a spindle journaled in the said bearing, a steering axle secured to the said spindle and having an axle spindle at one end which is inclined with respect to the axle spindle at its other end, and an inclined furrow wheel and a ground wheel mounted on the respective axle spindles.

In testimony whereof I have affixed my signature in the presence of two witnesses.

CHARLIE T. GENZEL.

Witnesses:
F. H. PIERCE,
MARGARET FRIED.

Copies of this patent may be obtained for five cents each, by addressing the "Commissioner of Patents, Washington, D. C."